United States Patent [19]

Lathlaen

[11] 4,448,482

[45] May 15, 1984

[54] VARIABLE GEOMETRY OPTICAL FIBER CONNECTOR

[75] Inventor: Richard A. Lathlaen, Thousand Oaks, Calif.

[73] Assignee: TRW Inc., Redondo Beach, Calif.

[21] Appl. No.: 407,192

[22] Filed: Aug. 11, 1982

Related U.S. Application Data

[63] Continuation of Ser. No. 149,888, May 14, 1980, abandoned.

[51] Int. Cl.³ .............................................. G02B 7/26
[52] U.S. Cl. .................................................. 350/96.21
[58] Field of Search ............... 350/96.20, 96.21, 96.22, 350/320

[56] References Cited

U.S. PATENT DOCUMENTS

| | | | |
|---|---|---|---|
| 3,734,594 | 5/1973 | Trambarulo | 350/96.21 |
| 3,871,744 | 3/1975 | Bridger et al. | 350/96.21 |
| 3,885,859 | 5/1975 | Dalgleish et al. | 350/96.21 |
| 3,902,785 | 9/1975 | Matthews | 350/96.21 |
| 3,936,142 | 2/1976 | Kersten | 350/96.15 |
| 3,936,143 | 2/1976 | Sato | 350/96.21 |
| 3,936,145 | 2/1976 | McCartney | 350/96.22 |
| 3,944,328 | 3/1976 | Kent et al. | 350/96.21 |
| 3,947,182 | 3/1976 | McCartney | 350/96.22 |
| 3,948,582 | 4/1976 | Martin | 350/96.21 |
| 3,950,075 | 4/1976 | Cook et al. | 350/96.22 |
| 3,989,567 | 11/1976 | Tardy | 156/158 |
| 3,990,779 | 11/1976 | McCartney | 350/96.21 |
| 4,008,948 | 2/1977 | Delgleish et al. | 350/96.21 |
| 4,047,796 | 9/1977 | Kao et al. | 350/96.20 |
| 4,047,797 | 9/1977 | Arnold et al. | 350/96.20 |
| 4,088,390 | 5/1978 | McCartney | 350/96.21 |
| 4,090,778 | 5/1978 | Phillips et al. | 350/96.20 |
| 4,161,347 | 7/1979 | Tardy | 350/96.21 |
| 4,236,787 | 12/1980 | Iacono et al. | 350/96.21 |
| 4,300,815 | 11/1981 | Malscot et al. | 350/96.20 |

FOREIGN PATENT DOCUMENTS

| | | | |
|---|---|---|---|
| 2555232 | 6/1977 | Fed. Rep. of Germany | 350/96.21 |
| 2710099 | 9/1978 | Fed. Rep. of Germany | 350/96.21 |
| 1467750 | 3/1977 | United Kingdom . | |
| 1556476 | 11/1979 | United Kingdom | 350/96.21 |

OTHER PUBLICATIONS

Goldstein et al., "A Connector-Like Device for Joining Optical Fibers," 12th *Annual Connector Symposium Proceedings*, Cherry Hill, N.J., Oct. 1979, pp. 214–220.
Thiel et al., "Optical Waveguide Cable Connection," *Applied Optics*, vol. 15, No. 11, Nov. 1976, pp. 2785–2791.
Dakss et al., "Field-Installable Connectors and Splice . . ." 12th Connector Sumposium, Cherry Hill, N.J., Oct. 1979, pp. 198–205.
"Demountable Connectors for Optical Fiber Systems" by Bedgood et al., Electrical Communication, vol. 52, No. 2.
"Preparation of Optical-Fiber Ends for Low-Loss Tape Splices" by Chinnok et al., The Bell System Technical Journal, vol. 54, No. 3, Mar., 1975.
"Connecting the Thread of Light" Fenton et al., Ninth Annual Connector Symposium, Oct., 1976.

*Primary Examiner*—John D. Lee
*Attorney, Agent, or Firm*—Neuman, Williams, Anderson & Olson

[57] ABSTRACT

A connector for use in effecting optical signal transmissive connections between the ends of optical fibers is provided employing at least three surfaces defining a fiber-receiving channel. The walls defining the channel surfaces are resiliently movable whereby application of compressive forces to the walls results in shrinkage of the interior channel defined thereby. The channel walls may thus align fiber ends disposed therein along a longitudinal axis.

32 Claims, 12 Drawing Figures

VARIABLE GEOMETRY OPTICAL FIBER CONNECTOR

This is a continuation of application Ser. No. 149,888 filed May 14, 1980 (now abandoned).

This invention relates to a connector for use in precisely aligning the ends of optical fibers adapted to engage in optical signal transmissive connections. More particularly this invention pertains to a novel deformable connector construction. The connector may comprise resilient wall members arranged to define a fiber-receiving passageway having a cross-sectional area which may be resiliently reduced or constricted in such manner that the ends of optical fibers previously disposed therein will be axially aligned.

The use of optical fibers for data transmission purposes has increased dramatically in recent years. As fiber optic systems often require connections between the ends of light-signal emitting fibers the prior art has been concerned for some time with the development of fiber-connecting systems enabling fiber ends to be repeatedly joined and disconnected quickly and efficiently.

Disorientation of fiber ends intended to abut in a light signal transmissive connection is a primary cause of light loss and light transmission inefficiency. Transverse misalignment of the fiber ends results in substantial signal loss increasing to approximately 4 dB with a lateral displacement of about one-half the fiber diameter. Fiber end separation and axial or angular misalignment of the fiber ends also reduces the efficiency of light transmission, resulting in light signal loss.

The prior art has resorted in the past to aligning abutting fiber ends along one edge of a square tube which may be filled with an index-matching fluid. A variety of fiber-connecting systems are disclosed in the article "Demountable Connectors For Optical Fiber System" by M. P. Bedgood, J. Leach and M. Mathews published in *Electrical Communication* Volume 52, No. 2, 1976.

Various other prior art endeavors to efficiently connect the ends of optical fibers in signal transmissive connections are disclosed in the following U.S. Pat. Nos. Schicketanz 3,870,395, Kent et al 3,944,328, Bridger et al 3,871,744, Sato 3,936,143, Dalgleish et al 3,885,859, Matthews 3,902,785, Kersten 3,936,142, Martin 3,948,582, Cook et al 3,950,075, Tardy 3,989,567, McCartney 3,990,779, Dalgleish et al 4,008,948, Kao et al. 4,047,796, and Arnold 4,047,797.

In all of the foregoing, rigid connector or guide members are employed for purposes of effecting a guiding action on abutting ends of optical fibers to be joined in a signal transmissive connection. Hodge applications Ser. No. 968,044 now U.S. Pat. No. 4,192,575 and Ser. No. 968,045, filed Dec. 8, 1978 commonly owned with the subject application and the disclosures of which are incorporated herein by reference are directed to optic fiber guides employing cylindrical glass surfaces for purposes of effecting a desired fiber-guiding action.

In all of the foregoing guiding structures the fiber-receiving channels in which the fibers are disposed are formed by rigid wall members.

The paper entitled "Connecting The Thread Of Light" by Kenneth J. Fenton and Ronald L. McCartney, published at the Ninth Annual Connectors Symposium on Oct. 20 and 21, 1976 at the Cherry Hill Hyatt House in Cherry Hill, N.J. is of interest inasmuch as it discloses a three-rod guide which is plastic or deformable and employed for aligning a fiber end within a fiber optic connection section.

In McCartney U.S. Pat. No. 4,008,390 an optical fiber connector is disclosed which utilizes termination pins employing projecting eyelets having uniformly crimped walls for centering a housed optical fiber. The eyelets, however, are merely single fiber-centering or locating elements disposed in mating hermaphroditic connector halves, and are not employed for simultaneously aligning two butting fiber ends by collapsing of resilient channel walls. Thus, the construction disclosed is similar in its application to that disclosed in the paper entitled "Thread of Light."

The article entitled "Preparation of Optical-Fiber Ends for Low-Loss Tape Splices" by E. L. Chennock, D. Gloge, P. W. Smith and L. Bisbee, published in *The Bell System Technical Journal*, Volume 54, No. 3, 1975 is of interest as a prior art technique as it discloses the use of a notched chip and opposed rubber mat for forming a sandwich-type splice for connecting a plurality of fibers disposed in tapes and which are to be optically joined in a fiber connector.

Many prior art connectors employed channels of fixed sectional configuration. Exemplary of the latter type comprise the fiber guides disclosed in Hodge application Ser. No. 968,044, filed Dec. 8, 1978, entitled Guide Connector Assembly For Joining Optical Fibers and Method of Marking Guide Therefor now U.S. Pat. No. 4,192,575 and Ser. No. 968,045, filed Dec. 8, 1978 entitled Optic Fiber Coupling Guide Method of Making The Same and Method of Use. The latter applications are commonly owned with this application and the disclosures thereof are incorporated herein by reference.

In accordance with the invention of this application, it is intended to provide antithetical requirements of an efficient optic fiber connector. Such conflicting requirements include a desired loose tolerance enabling the optical fibers to be readily inserted in opposed ends of a connector guide channel in the initial phase of the connection. Such ready insertion is desirably effected without the danger of abrasion of delicate cladding material of the ordinary optical fiber which could result in significant light losses. Although the provided connector enables the fibers to be readily initially inserted, it subsequently effects precise alignment of the fiber ends both axially and radially following abutting of the fiber ends. The connector also insures long-term stability of the fiber joint and continuous efficient signal transmission.

In accordance with this invention, such conflicting requirements are provided by a connector having an alignment channel for receiving the fiber ends to be connected in which the cross-sectional configuration of the channel may be readily and uniformly reduced. Such change comprises a shrinkage of the channel cross-section as the channel walls are inwardly urged into contact with the fiber ends to be aligned. As the channel-defining walls may be formed of a resilient elastomer, the walls may uniformly deform about peripheral portions of the fibers as the fiber ends are brought thereby into alignment along a common axis and the fiber peripheries contacted sufficiently firmly to hold them in place. The contact between the elastomeric guide walls and the delicate cladding on the fiber and exteriors may be effected in the absence of any fiber damage such as might occur when the guide walls are metal members which are urged into contact with fiber cladding. In modifications of the provided guide of this invention, however, the flexible guide walls may be formed of thin metal or plastic.

It is an object of this invention, therefore, to provide an optical fiber connector construction adapted to precisely control radial, longitudinal and axial alignment between the fiber ends to be joined in a signal transmissive connection.

It is another object of this invention to insure optimum light transmission between the ends of abutting optical fibers of dissimilar cross-sectional are because of the novel centering action of the provided guide.

It is a further object of this invention to provide a connector construction having a fiber-receiving channel which although large enough to readily receive the fiber ends in a preliminary connecting stage, may be readily deformed by the application of isostatic pressure so as to precisely align the optical fiber ends to be connected.

It is another object of this invention to provide a method for joining optical fiber ends by shrinking the fiber-receiving channel of a connector, the steps of which are readily utilized in a variety of connector constructions.

It is yet another object of this invention to provide a connector construction having a fiber-receiving channel of variable geometry which may be employed in repetitive fiber connect-disconnect operations.

It is a further object of this invention to provide a novel connector having a fiber-receiving channel of variable geometry in which the applied alignment forces although urging the fiber ends into desired alignment may be controllably applied in such a manner so as assure the absence of any damage to the fiber or the cladding thereon.

It is still another object of this invention to provide an optic fiber connector which is amenable for use with index-matching fluids or gels.

In one embodiment of the provided invention three thin-walled resilient tubes are disposed in a close packed arrangement so as to define a tricuspid channel of closed cross-section extending the length of the tubes. The tubes are of uniform diameter and thickness. The cross-sectional area of the channel is such as to enable ready entry from opposed channel ends of optical fibers to be butted in a desired signal transmissive connection in the channel at a point intermediate the opposed channel ends. As used herein the terms "butted" and "abutment" refers to the fiber ends being in such proximity, including, but not necessarily in contact, to provide a good optical signal transmissive connection.

In the carrying out of this invention in the tricuspid embodiment the diameters of the optical fibers to be butted within the channels should preferably be between approximately 0.1 and 0.16 of the uniform diameter of each of the three thin-wall tubes defining the channel. If such relationship is present, the fibers to be optically connected may readily enter the channel and are prevented from passing each other in the channel by virtue of the channel-optic fiber diameter relationship.

After insertion of the optic fiber end portions into the channels so that the ends thereof are butted in the channel interior, the cross-sectional area of the tricuspid channel is reduced to the extent that the walls contact the fibers and the fiber ends within the channel are thereby precisely aligned along a common longitudinal axis. Such reduction of the channel cross-section is preferably effected by the application of a uniform or isostatic pressure about the outwardly exposed periphery of the three thin-wall tubes, forcing the channel-defining portions of the tubes disposed innermost to bend or collapse into the tricuspid passage and thereby effect surface contact with longitudinal peripheral portions of the optic fibers disposed therein. Various means which may be employed for purposes of applying such an isostatic pressure will be described in detail hereinafter.

For a more complete understanding of this invention reference will now be made to the drawings wherein.

Figures 1, 4, 5:
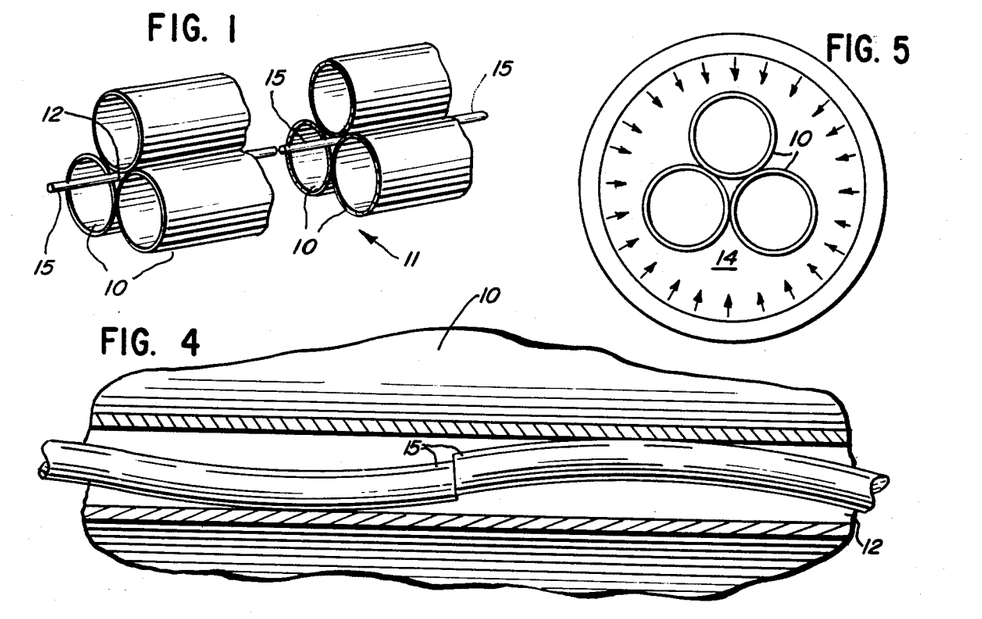
FIG. 1 is a broken-away, perspective view illustrating three thin-wall guide tubes which may be employed as a basic guide and connector component in carrying out the invention of this application.
FIG. 4 is a fragmentary longitudinal sectional view of the fiber-receiving channel of a guide connector of the provided invention with the illustrated fibers in an initial position prior to shrinkage of the cross-sectional area of the channel.
FIG. 5 is a schematic illustration depicting the application of an isostatic pressure to the basic guide components of FIGS. 3 and 4 for purposes of effecting shrinkage in the tricuspid channel so that the channel cross-section may change from that of FIG. 2 to that of FIG. 3.
Figure 2:
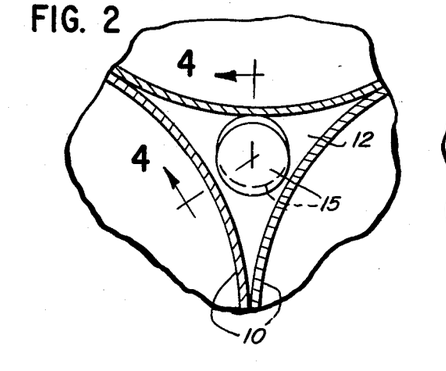
FIG. 2 is a transverse sectional view illustrating the interior of a fiber-receiving channel of a guide made pursuant to this invention with two optical fibers disposed therein in an initial position of engagement prior to shrinking of the channel cross-section for purposes of effecting fiber alignment.

For a more complete understanding of this invention and its various embodiments, reference will now be made to the drawings. In FIG. 1 a perspective view depicts three small diameter thin-wall tubes 10 which define a tricuspid longitudinal fiber-receiving channel 12. The specific configuration of the tricuspid channel 12 is most apparent from the fragmentary view comprising FIG. 2 of the drawing. It will also be noted from FIG. 2 that the cross-sectional area of the channel 12 is such as to readily receive optical fibers 15 having a peripheral cladding disposed thereabout to minimize light loss in the course of light signal transmission.

It is the function of the connector provided by this invention to allow a ready connection between the ends of optical fibers such as illustrated fibers 15 in channel 12 defined by resilient wall portions of the thin-wall tubes 10. Although the fibers 15 are desirably readily received within the channels, they must not be of such small diameters as to pass one another as is evident from the longitudinal sectional view comprising FIG. 4 of the drawing illustrating a connector of this invention after the fibers 15 have been inserted in the opposed open ends of the tricuspid fiber-receiving channel 12. To insure easy insertion of the optical fibers into opposed ends of the tricuspid channel, and to simultaneously obviate failure to effect an abutment between fiber ends occasioned by such ends passing each other, a predetermined size relationship should exist between the fiber diameters and the diameters of the cylindrical surfaces such as tubes 10 defining the tricuspid channel in which the fibers are disposed. The requirements of butting fiber ends and easy entry into the ends of the cusp-shaped channel 12 will be met if the optical fiber diameters are between 0.1 and 0.16 of the uniform outside diameter of each of the tubes 10 defining the channel.

Figure 3:
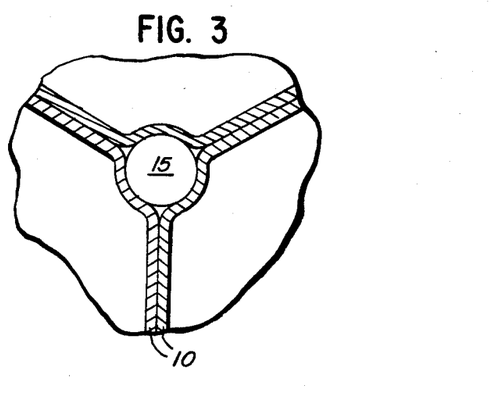
FIG. 3 is a view similar to FIG. 2 after the sectional area of the fiber-receiving channel has been shrunk.

After the fibers have butted in the position of FIG. 4 of the drawing, thin-wall tube portions defining the walls of channel 12 are bent inwardly, as by the application of pressure about the exterior of the tubes to collapse or shrink the channel. Contact is thereby made with peripheral portions of the butted fibers 12 in the manner illustrated In FIG. 3.

The simple, thin-wall tube connector of FIG. 1, therefore, serves as an excellent aligning medium for fiber ends if the following conditions are met: The close-packed tubes 10 should have such characteristics that the end of each fiber will be contacted and positioned alike for effective abutment. This is achieved in one embodiment if the tubes 10 are uniform and symmetrical and, in addition, have uniform elastic properties so that the collapsing action evident from a comparison of FIGS. 2 and 3 will be uniform and result in aligning of the optical fiber ends along a single longitudinal axis. The collapsing pressure applied to the thin-wall tubes 10 in such embodiment is uniform or isostatic for desired uniform tube collapse. A further practical requirement is that the tube-collapsing pressure be capable of being easily applied by a workman in the field.

Alternatively, the tubes may be unequal in collapsing characteristics as, for example, where two are more rigid than the third so that the fiber ends are predictably forced into one cusp, between the more rigid tubes, upon the greater deformation of the third tube.

Figures 6, 7, 8, 9, 10, 11:
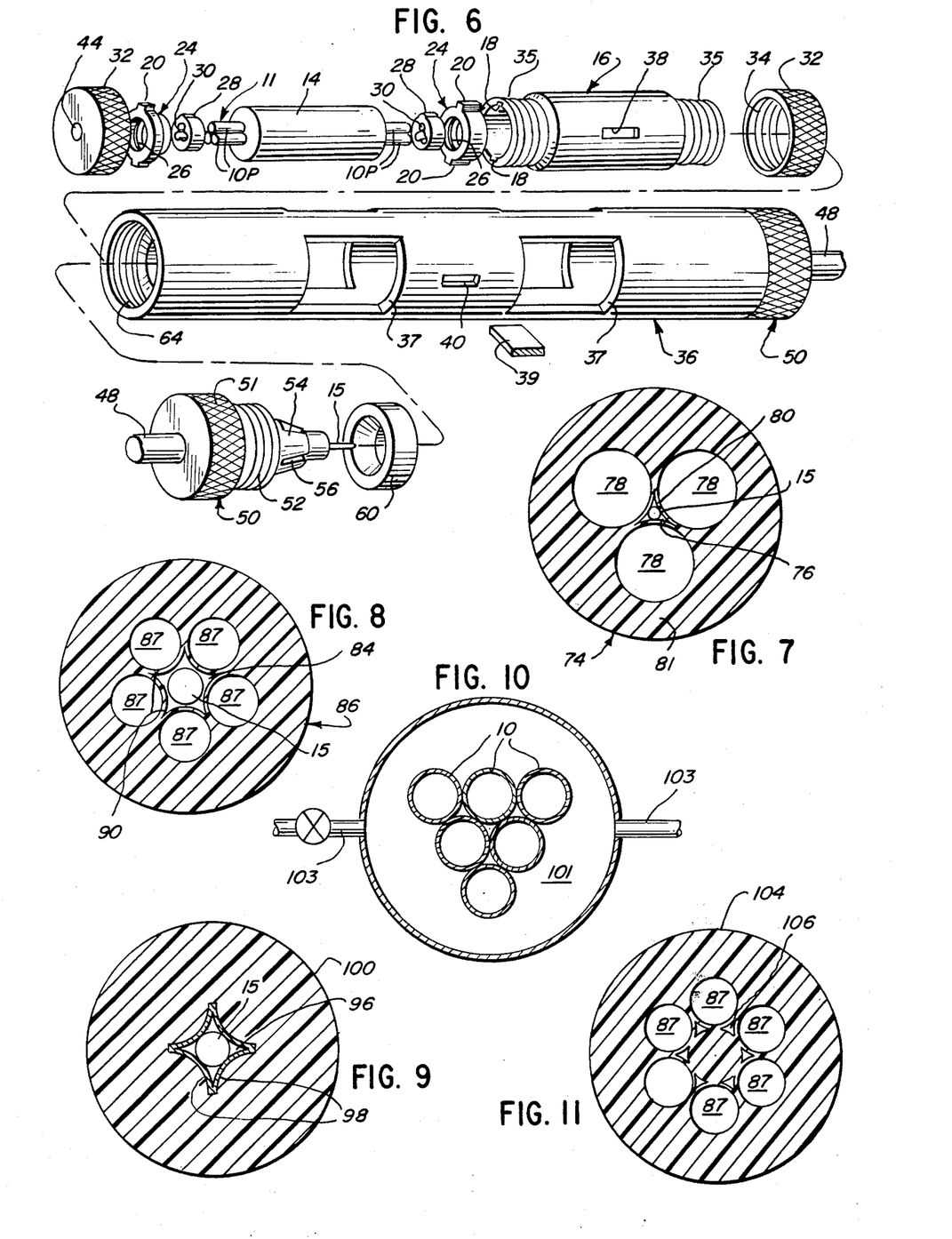
FIG. 6 is an exploded view illustrating elements of a connector which may be employed for purposes of imparting an isostatic pressure to a collapsible fiber-aligning channel.
FIG. 7 is a transverse sectional view of an integral extruded member having a central, collapsible fiber-receiving channel.
FIG. 8 is a transverse sectional view similar to that of FIG. 7 illustrating a modified form of integral extruded member having a central fiber-receiving channel with five cusps, such channel being collapsible in the same manner as the channel of FIG. 7 and of FIGS. 3 through 5.
FIG. 9 is a transverse sectional view similar to that of FIG. 3 illustrating a fiber-receiving channel formed by four metal convex wall sections defining a four-cusp interstitial channel.
FIG. 10 is a sectional view illustrating a reversibly collapsible fiber guide member disposed in a shell adapted to facilitate application of isostatic pressure.
FIG. 11 is a sectional view of an extruded integral member having a plurality of fiber-receiving channels such as illustrated in FIG. 8 whereby a plurality of individual fibers may be simultaneously connected in light signal transmissive connections.

FIG. 6 is an exploded view of a connector which may be employed in the field for uniformly transferring, hand-applied collapsing force so that the three connector tubes 10 of FIG. 1 may be uniformly radially compressed. It will be noted from the exploded view of FIG. 6 that tube assembly 11 comprising a fiber guide and connector fragmentarily illustrated in FIG. 1 and utilizing the three thin-wall tubes 10 has a major longitudinal portion interposed projecting tube end portions 10P potted or encased inside an enveloping elastomer such as silicone rubber, defining cylinder 14. The cylinder 14 is employed for transforming axially applied forces which are imparted to the opposed cylinder circular end surfaces into uniform radial pressure forces on the exposed surface of the tubes 10, with the resultant forces causing the inner channel-defining wall portions thereof to bend from the condition of FIG. 2 to that of FIG. 3. The axially applied forces may be converted into the uniform radial forces inasmuch as the elastomeric material employed for force-transferring purposes has a high Poisson ratio, typically greater than about 0.4. Such a property enables the elastomeric cylinder 14 in which the guide 11 is potted to behave substantially like a liquid with respect to compressibility.

To enable the axial pressures applied to the opposed ends of the elastomer cylinder 14 to be converted into radial tube-collapsing pressure, cylinder 14 and its encased tubes 10 are inserted in a close fitting pressure housing 16 having longitudinal keyways 18 formed 180° apart on inner peripheral surface portions thereof. Keyways 18 engage opposed keys 20 formed 180° apart on the outer periphery of opposed pressure plates 24 employed for purposes of transferring axially applied pressure to the ends of the elastomeric cylinder 14 in a manner hereinafter described in detail.

Each pressure plate 24 has an annular recess defining an annular shoulder 26 which is adapted to receive in abutting engagement an outer annular ring portion of cylindrical bearing disc 28 having a central recess 30 adapted to interfit with the outer periphery of the three tube portions 10P extending from opposed ends of cylinder 14. It is thus seen that as axial pressure is applied to the opposed ends of the elastomeric cylinder 14 by means of the opposed pressure plates 24, compression forces will be exerted on the opposed ends of the elastomeric cylinder 14 which surrounds the major portion of the encased guide 11. The axial forces imparted by the pressure plates 24 are transmitted to the elastomeric cylinder ends through the interposed bearings 28 which are preferably of polyethylene or other rigid plastic material.

Prior to application of an axial force on the pressure plates 24 the elements of FIG. 6 are assembled as follows. A first pressure plate 24 is inserted in the pressure housing 16 by having the keys 20 interfit with the keyways 18 after which the elastomeric cylinder 14 and partially encased connector-guide 11 together with opposed bearings 28 fitted over the exposed ends 10P of the tubes 10 are inserted in the housing 16. The second pressure plate 24 is then inserted in the remaining longitudinal cylindrical cavity portion of the housing 16.

Figure 6A:
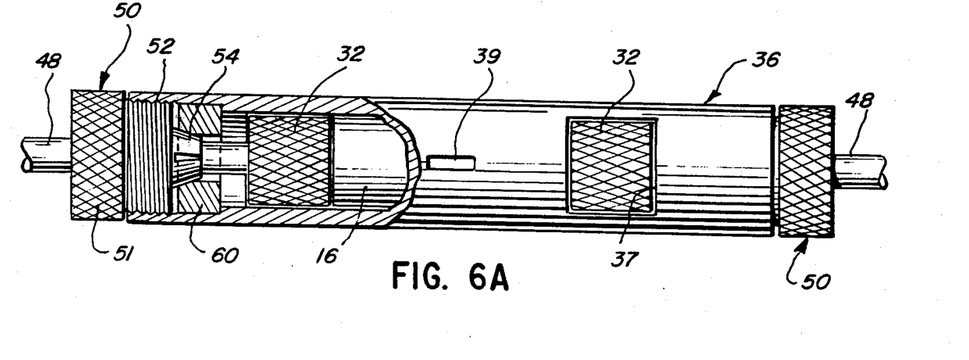
FIG. 6A is an elevational view, partly broken away, of the elements of FIG. 6 in a state of assembly.

Compression forces may be applied to the opposed ends of the elastomeric cylinder 14 through interposed pressure plates 24 and bearings 28 by means of opposed lock nuts 32. The opposed lock nuts have a knurled outer periphery and are internally threaded at 34 (FIG. 6) for purposes of engaging opposed male threads 35 formed at the opposed longitudinal ends of the pressure housing 16. After the lock nuts are loosely applied to the opposed ends of the housing with the aforementioned elements disposed in the interior of the housing, the housing assembly is inserted in cable lock housing 36 of FIG. 6. Slot 38 of pressure housing 16 and slot 40 of cable lock housing 36 are adapted to receive a common key such as key 39 of FIG. 6 when superposed. The key will traverse the aligned slots 38 and 40 and prevent relative movement between the pressure housing and cable lock housing. FIG. 6A illustrates the pressure housing 16 located within the cable lock housing 36 for purposes of effecting a desired fiber end connection.

It will be noted from FIG. 6 that each lock nut 32 has a central opening 44 disposed therein for purposes of receiving an end portion of an optical fiber cable 48 as seen in FIG. 6 as well as a concentric inner optical fiber 15. The opposed cables 48 from which the optical fibers 15 to be joined in a light signal transmissive connection extend, are lockingly retained in cable grips 50 each of which possesses a knurled hand-engageable disc 51 from which extends a threaded cylindrical portion 52 which is in turn joined to a tapered conical portion 54 having slots 56 disposed therein.

In the normal course of apparatus use, the pressure housing assembly comprising the housing 16, pressure plates 24, bearings 28 and lock nuts 32 which are assembled with the elastomeric cylinder 14 containing the connector-guide 11 are inserted in the cable lock housing 36 and locked in place relative thereto by means of a locking key such as key 39 traversing the housing slots 38, 40. Taper plates 60 are then inserted in the opposed open ends of the cable lock housing 36 for guiding fiber ends to be butted into the opposed lock nut apertures 44 prior to entering opposed ends of the channel 12. The threaded portions 52 of the cable grips 50 threadedly engage female threads 64 formed about the opposed end inner peripheries of the cable housing 36.

The interval between the distal ends of the tapered cable grip portions 54 after the cable grips have been threaded home into terminal positions in the opposed ends of the cable lock housing is a known dimension; the distance each optical fiber end which is to be butted in the interior of the pressure housing extends from the terminal end of the cable grip conical portion 54 is slightly greater than precisely one-half the known interval. Accordingly, upon threading the cable grips into terminal positions relative to the cable lock housing 36, the distal ends of the optical fibers 51 will be in relative disposition for abutting in a desired face-to-face signal transmissive connection upon collapse of the interstitial channel 12 of the elastomer-encased connector-guide 11 in which disposed.

The lengths of the fibers 15 extending between the ends of cable grips 50 is such as to form a slight bow in one or both fibers which will occur exteriorly of the collapsed guide channel 12. The bow will form in the fiber portion or portions disposed in the interval between the distal end of the cable 48 projecting from a cable grip 50 and the adjacent collapsed end of the guide channel 12. Thus by the use of proper fiber lengths in the connector illustrated in FIGS. 6 and 6A, butting of the fiber ends to be connected is assured.

The above-described method of connection employing the apparatus of FIG. 6 is amenable to the use of an index-matching liquid or gel disposed in the channel 12 between the fiber ends to minimize light signal loss. The material of fabrication of the connector tubes 10, of course, should not be deleteriously affected by the index-matching material employed.

After the cable grips 50 have been threaded home into place relative to the ends of cable lock housing 36 and the ends of fibers 15 are in the relationship illustrated in FIG. 4, the lock nuts 32 are rotated by hand through windows 37 of the cable lock housing. The manual threading of the nuts 32 applies axial pressure to the opposed ends of the confined elastometric cylinder 14, resulting in uniform collapse of the tubes 10 defining the guide 11 as illustrated in FIG. 4. As the pressure plates 24 are keyed to the housing so as to move axially, the elastomer-engaging bearings 28 will similarly move. Accordingly, no twisting action will be imparted to the tubes or cylindrical body 14 which could result in delamination between the tubes 10 or between the connector-guide 11 and the cylinder 14 with deleterious consequences imparted to the optical fibers contained therein.

FIG. 7 illustrates a transverse section of an elastomeric cylinder body 74. The cylindrical body 74 is extruded with a small central fiber-receiving cavity 76, which as illustrated is tricuspid and adapted to perform in substantially the same way as the connector-guide 11 comprising the three thin-wall tubes 10. Thus the cylinder 74 comprises in a single extrusion the combination of the assembly 11 of FIG. 6 and the potted elastomeric cylinder 14 disclosed thereabout. Similarly to the elastomeric cylinder 14, the body 74 should be of uniform consistency and the arrangement of cavities 78 as well as configuration of the central channel 76 should be uniformly symmetrical through the length of the cylinder 74. Inasmuch as the wall portions 80 defining the central channel 76 are of a lesser thickness than wall portions 81 defining the longitudinal apertures 78, the thin-walled portions 80 will bend similarly to channel-defining tube portions in the assembly 11 in the manner previously described. Thus, channel 76 will uniformly collapse upon application of isostatic pressure such as upon the imparting of axial compression forces to the opposed ends of the cylinder 74 when the same is disposed in a confining housing such as the pressure housing 16 of FIG. 6.

FIG. 8 comprises a transverse sectional view of a longitudinal channel 84 disposed in elastomeric cylinder 86. Cylinder 86 employs five longitudinal cavities 87 rather than the three of FIG. 7, defining a five pointed, star-shaped channel in which the fiber-containing cavity 84 possesses five cusps. Thus, upon isostatic compression being imparted to cylinder 86, collapsing of the fiber-containing channel 84 will occur as a result of the inward bending of five thin-wall portions 90 rather than the three thin-wall portions 80 of FIG. 7.

It is believed apparent from the foregoing description that a basic method for aligning and connecting optical fibers has been disclosed which is not restricted to the specific apparatus illustrated in the drawings. The fiber connectors need not of necessity comprise thin-walled tubing members as any thin-walled cavity which controllably and reversibly collapses will satisfy the purpose of this invention. Accordingly, FIG. 9 illustrates a fiber-receiving channel 96 having four cusps. The channel 96 is formed by four, metallic, convex wall sections 98 which may be discrete members joined at their ends or an extruded integral member or may be separate members. The elements 98 are embedded in a cylinder of elastomeric material 100 for collapse under isostatic pressure generated in the manner above described, with the collapsing forces being applied directly to the outer surfaces of the sections 98. FIGS. 7 and 9 illustrate the flexible, channel-defining walls at the instant of tangential contact with an encompassed fiber.

The above method of joining fiber ends is not restricted to single fiber pairs, as a plurality of six thin-wall tubes 10 illustrated in FIG. 10 may be employed for simultaneously connecting four fiber pairs. The tubes may be centrally located in a gas-tight or liquid-tight chamber 101 having appropriate valved inlets and outlets 103 for filling and exhausting a fluid medium, and creating a desired isostatic pressure about the outer peripheries only of the thin-wall tubes 10. The inner tube portions are sealed together at their points of contact so as to permit bending of the thin walls defining the fiber passageways 12 upon pressure application.

An integral, extruded elastomeric member such as member 104 illustrated in FIG. 11 may be employed for simultaneously interconnecting a plurality of fiber pairs by means of collapsible channels 106.

It is believed apparent that the apparatus assembly of FIG. 6 is reusable for purposes of repeatedly effecting different optic fiber connections. All that need be done, for example, is to threadedly retract the cable grips from the cable lock housing and the lock nuts from the pressure housing whereafter one or both optical fiber cables may be replaced for a new connection.

It is thus seen from the foregoing that the provided connector construction may be readily employed by workmen in the field without the need for any tools. The connector assembly is assembled manually and the desired collapse force of the fiber-receiving channel is effected by the application of manual pressure through the lock nuts 32.

It is believed apparent that inasmuch as the connected fibers are engaged along an extensive portion of their length by the collapsing connector guide portions, the resulting connection is extremely stable and will not be deleteriously affected by vibration. It should also be appreciated that the collapse of the connector channel in which the fibers are disposed in the various embodiments above described results in very little, if any, forces being exerted along the axis of the channel and therefore there is very little, if any, tendency for the fibers initially in contact to separate during the alignment pressure-applying step. Thus, in the application of pressure for bending the walls defining the fiber-receiving passageway, the application of the pressure bending the channel-defining walls should not result in elongation of the channel occasioned by stretching of such walls. Such stretching would result in fiber separation and light loss.

The channel-forming elements of the connector should preferably have no permeability to organic vapors and be chemically inert, allowing the employment of index matching liquids or gels to minimize light loss.

Assuming that the guide tubes 10 are made from a material having a low melting point, such tubes would be very easily spin welded or ultrasonically bonded into a desired close packed or other fixed guide configuration.

It is evident from the foregoing description and of the manner in which the fiber-receiving channel of the provided connector of this invention collapses that if the butted fibers are of dissimilar cross-sectional areas the same will nevertheless be aligned along a common longitudinal axis, thereby minimizing any light loss because of the discrepancy in the sectional areas. Assuming that the smaller fiber is the light emitter, any light loss is negligible; if the fiber of larger sectional area if a light emitter, any light loss is minimized by virtue of a coaxial relationship between the fiber ends. The provided connectors between fibers to be connected along a common central axis, regardless of the dissimilarity of the fiber diameters. As above mentioned, the provided connector elements provide for repeated connect and disconnect operations so long as the elastic limit of the channel-forming elements is not exceeded.

It is apparent from the foregoing description that the cross-section of the element or elements defining the fiber-receiving channel need not be symmetrical. In various embodiments of this invention a desideratum is the ability of the channel-defining portions to collapse uniformly along a plurality of lines of contact whereat the optical fibers are engaged. Thus it is apparent that the fibers may be aligned in the manner above described along a single central longitudinal axis despite a channel configuration which may be nonsymmetrical in section and engineered in such a way that the channel collapses nonuniformly about the fiber peripheries. Also, the channel sides need not meet in the cusps. Though the sides should be in predetermined close relationship to preclude escape of a fiber from the channel during insertion and therefore define a channel of effectively closed cross-section, various shapes may be chosen such as a triangle, quadrangle, arc of a circle, etc.

Furthermore, as noted above, in alternative embodiments all of the walls of the channel ned not collapse equally upon application of isostatic pressure. Rather, for example, in a tricuspid or triangular shaped channel, two walls may be more rigid than the third, whereby greater collapse of the third wall into the channel causes the fibers to preferentially be urged toward the junction of the other two. Such structures may be accomplished by varying wall thickness, by varying the size of the cavities behind the walls, including having no cavity, or even by varying the physical characteristics of the walls such as by lining the wall with a metal or plastic strip, or by treating the walls preferentially for greater rigidity.

The forces for selectively effecting inward collapse of the resilient channel walls may be generated by means other than applying uniform pressure through a single surrounding medium as in the aforedescribed preferred embodiments. For example, a different pressure could be applied to each of the channel wall elements through separate pressure elements or supports. Also, inward forces may be applied directly to the apices of a cusp-shaped channel defined by flexible concave wall elements, for example as illustrated in the copending application Ser. No. 149,889, filed May 4, 1980 of Ronald L. Schultz, filed concurrently herewith and entitled OPTICAL FIBER CONNECTOR CONSTRUCTION now U.S. Pat. No. 4,353,620, the disclosure of which is incorporated herein by reference.

It is believed apparent that the foregoing description has suggested a number of modifications which may be made in the embodiments disclosed in the drawing of this invention. Accordingly, this invention is to be limited only by the scope of the appended claims.

What is claimed is:

1. A connector for use in effecting optical signal transmissive connections between the ends of optical fibers comprising an elastomeric body having a thin-walled, fiber-receiving passageway therein; said body also having means surrounding and formed integrally with the passageway thin walls for bending the thin walls of said passageway so as to shrink the cross-sectional area of said fiber-receiving passageway by bending the thin walls thereof inwardly, whereby optical fibers disposed in said passageway are aligned along a common longitudinal axis.

2. The connector of claim 1 in which said elastomeric body is cylindrical and said fiber-receiving passageway is uniformly surrounded by longitudinal cylindrical passageways for bending the walls of said passageway upon the application of axial compressive forces to opposed ends of said elastomeric body.

3. In a connector for effecting optical signal transmissive connections between the ends of optical fibers, the combination comprising at least three members having inner convex surfaces defining walls of a cusp-shaped, fiber-receiving passageway therebetween for receiving the ends of optical fibers to be connected in a loose fit; said members having outer surfaces disposed exteriorly of said passageway; said members being thin-walled and readily deformable whereby each wall defining such passageway may be readily bent and deformed about the outer peripheries of fibers to be aligned by applying forces directed toward said passageway to said members exteriorly of said passageway; said members being resilient so as to substantially return to their original passageway-defining position following release of said forces.

4. The connector of claim 3 in which each of the thin-walled members is bendable without elongation of said passageway.

5. The connector of claim 3 in which the thin-walled members comprise thin-walled tubes secured together in a close-packed, parallel relation.

6. The connector of claim 3 wherein each of said members is a longitudinally extending peripheral segment of a cylindrical member.

7. The connector of claim 3 in which said thin-walled members are substantially uniform and define a passageway of substantially uniform sectional configuration.

8. The connector of claim 3 in which said passageway walls are formed of metal or plastic.

9. The connector of claim 3 in combination with means for uniformly inwardly bending said members whereby optical fibers disposed in said passageway are aligned along a common longitudinal axis.

10. The connector of claim 9 in which said means for inwardly bending said members comprises means for applying compressive forces to outer portions of said members.

11. The connector of claim 10 wherein said means for applying compressive forces includes means for generating pressure isostatically about outer portions of said members.

12. The connector of claim 3 in combination with means for applying pressure to said members including elastomeric means encompassing at least a central portion of said at least three members, and means for applying axial forces to opposed ends of said elastomeric means and converting said forces into radial forces uniformly moving said walls toward the central longitudinal axis of the passageway defined thereby.

13. In a connector for effecting optical signal transmissive connections, the combination comprising at least three members defining a fiber-receiving passageway for receiving the ends of optical fibers to be connected in a light-transmissive connection; all of said members except one defining at least one relatively rigid, fiber-aligning juncture of the passageway interior; one of said members oppositely disposed to at least one relatively rigid juncture being thin and readily bendable for urging optical fiber ends to be aligned by said at least one relatively rigid juncture into said one relatively rigid juncture; and means for bending said bendable member inwardly toward said at least one relatively rigid juncture.

14. The connector of claim 13 in which optical fibers are disposed in said passageway in at least one relatively rigid juncture in an optical signal transmissive connection and retained therein by said readily bendable member.

15. The connector of claim 3 or 13 in which optical fibers are disposed in said passageway in an optical signal transmissive connection and the passageway-defining walls are deformed about said fibers.

16. In a connector for effecting optical signal transmissive connections, the combination comprising at least three members defining a fiber-receiving passageway for receiving the ends of optical fibers to be connected in a light-transmissive connection; some of said members defining at least one relatively rigid fiber-aligning juncture in the passageway interior; at least one of said members oppositely disposed to at least one relatively rigid juncture being thin and readily bendable for urging optical fiber ends to be aligned by said at least one relatively rigid juncture into said one relatively rigid juncture; and means for bending said at least one bendable member inwardly toward said at least one relatively rigid juncture.

17. In a connector for aligning optical fiber ends, the combination comprising at least three members defining a fiber-receiving passageway for receiving end portions of optical fibers in a loose fit; at least some of said members converging outwardly and defining a fiber-aligning juncture therebetween in said passageway; at least one of said members being thin and bendable and disposed relative to said fiber-aligning juncture so as to urge fiber end portions disposed in said passageway into said juncture upon being bent inwardly into said passageway; and means for bending said at least one thin and bendable member inwardly into said passageway.

18. The connector of claim 17 in which said connector comprises three members and each of said three members is thin and bendable; each pair of adjacent members converging outwardly and defining a fiber-aligning juncture therebetween.

19. The connector of claim 3, 16, 17 or 18 wherein each of said members comprises a thin arcuate wall segment extending between adjacent junctures or apices of said passageway.

20. The connector of claim 19 comprising at least three nested thin-walled cylindrical tubes, each of said members comprising a segment of the respective tube.

21. The connector of claim 19 comprising at least three nested, thin-walled cylindrical tubes, each of said members comprising a segment of the respective tube; an elastomeric body closely surrounding said tubes, and means for effecting pressure in said elastomeric body and thereby flexing said segments into said passageway for aligning the end portions of optical fibers when disposed therein.

22. The connector of claim 19 in which each of said members comprises a segment of a nested thin-walled cylindrical tube, and said tubes are in combination with an elastomeric body surrounding said tubes; means for effecting pressure in said elastomeric body for flexing said segments into said passageway and aligning the end portions of optical fibers when disposed therein; said means for effecting pressure including a housing surrounding said elastomeric body and means movable inwardly of said housing for effecting such pressure in said elastomeric body.

23. The connector as in claim 19 including an elastomeric body circumscribing said passageway, each of said wall segments being integral at its ends with said elastomeric body at the respective junctures or apices of said passageway.

24. The connector of claim 19 in which an elastomeric body circumscribes said passageway and in which said body and said segments define a cylindrical cavity adjacent each of said segments on the outward side thereof relative to said passageway.

25. The connector of claim 17 in which only one of said members is thin and bendable and two of the remaining members converge and define a relatively rigid, fiber-aligning juncture; said one thin and bendable member being bendable inwardly into said passageway toward said juncture.

26. The connector of claim 13, 16 or 17 in which each of said thin members is bendable toward an oppositely disposed juncture without passageway elongation.

27. The connector of claim 26 in combination with two optical fibers disposed in said passageway in an end-to-end light transmissive connection and aligned along a common axis; said fibers remaining so connected following engagement with said thin member.

28. The connector of claim 3, 13, 16 or 17 in combination with means for applying pressure to said members including an elastomeric body surrounding a central portion of said at least three members; said elastomeric body having a poisson ratio greater than about 0.4; said means for applying pressure also including a pressure housing snugly receiving the outer periphery of said elastomeric body; means for applying axial compressive forces to opposed ends of said elastomeric body received in opposed ends of said pressure housing; and a slotted housing encompassing said pressure housing and having opposed ends for engaging in fixed relation end portions of optical fiber cables; the slots of said slotted housing enabling said means for applying axial compressive forces to be manipulated while said pressure housing is disposed within said slotted housing.

29. The connector of claim 1 or 17 in which said passageway is cusp-shaped.

30. In a method of aligning optical fiber ends in desired optical signal transmissive relation, the steps comprising forming a passageway of thin, readily bendable walls for receiving such fiber ends in a loose fit; disposing a pair of such optical fiber ends in said passageway with at least portions of such fiber ends of such pair in mutually abutting engagement; and inwardly bending the thin walls of said passageway in the absence of wall elongation by the application of pressure about the outer peripheries of said bendable walls until said walls position such abutting fiber ends along a common axis.

31. The method of claim 30 in which said passageway is cusp-shaped and formed by aligning three uniform thin-wall tubes in parallel, tangential engagement.

32. The method of claim 30 in which the applied pressure is isostatic.

* * * * *

UNITED STATES PATENT AND TRADEMARK OFFICE
CERTIFICATE OF CORRECTION

PATENT NO. : 4,448,482
DATED : May 15, 1984
INVENTOR(S) : Richard A. Lathlaen

It is certified that error appears in the above-identified patent and that said Letters Patent are hereby corrected as shown below:

Column 2, line 3, delete "4,008,390" and insert --4,088,390--;

line 28, delete "Marking" and insert --Making--.

Column 3, line 10, delete "are" and insert --area--.

Column 7, line 38, delete "51" and insert --15--.

Signed and Sealed this

Eighth Day of April 1986

[SEAL]

Attest:

Attesting Officer

DONALD J. QUIGG

Commissioner of Patents and Trademarks